UNITED STATES PATENT OFFICE.

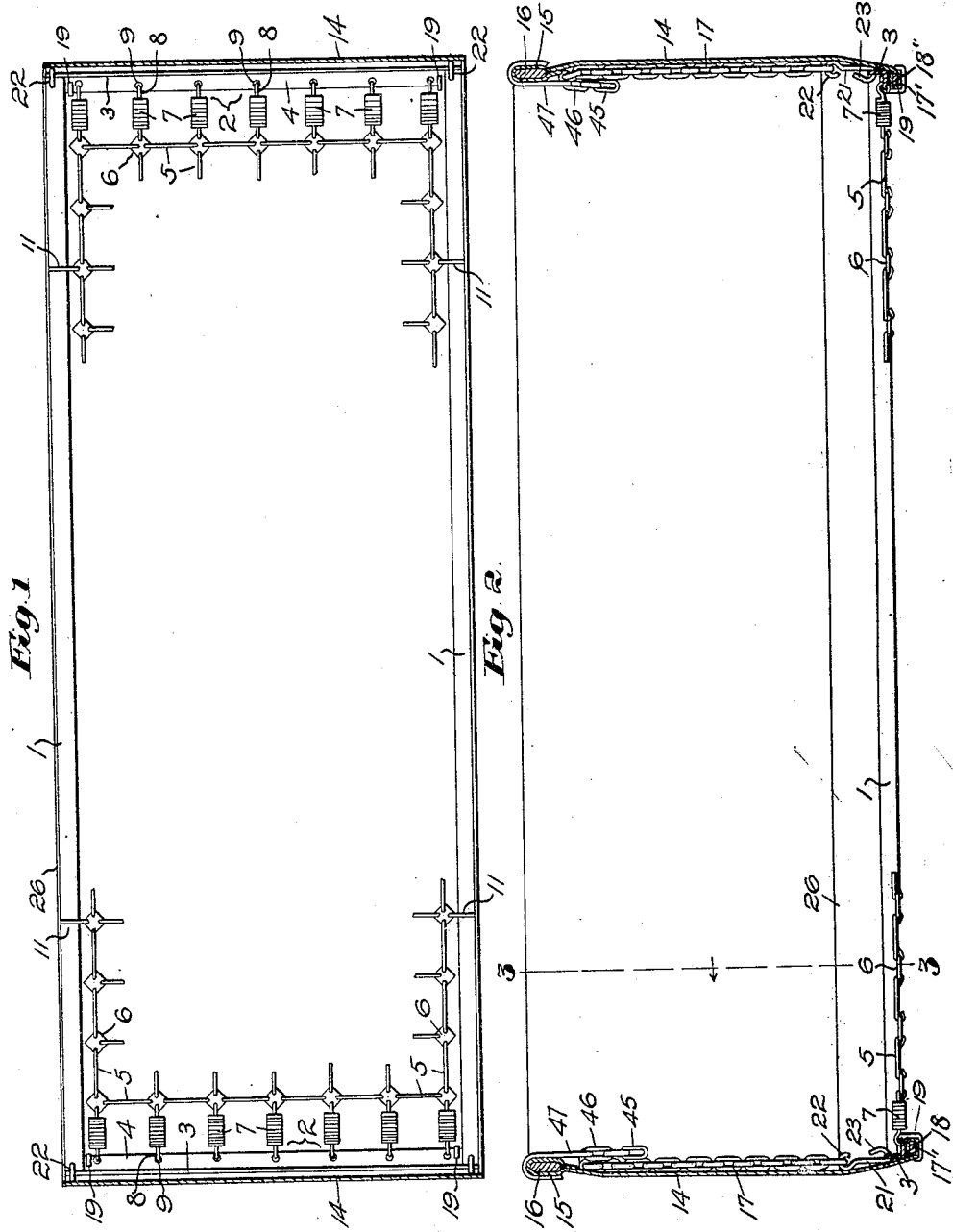

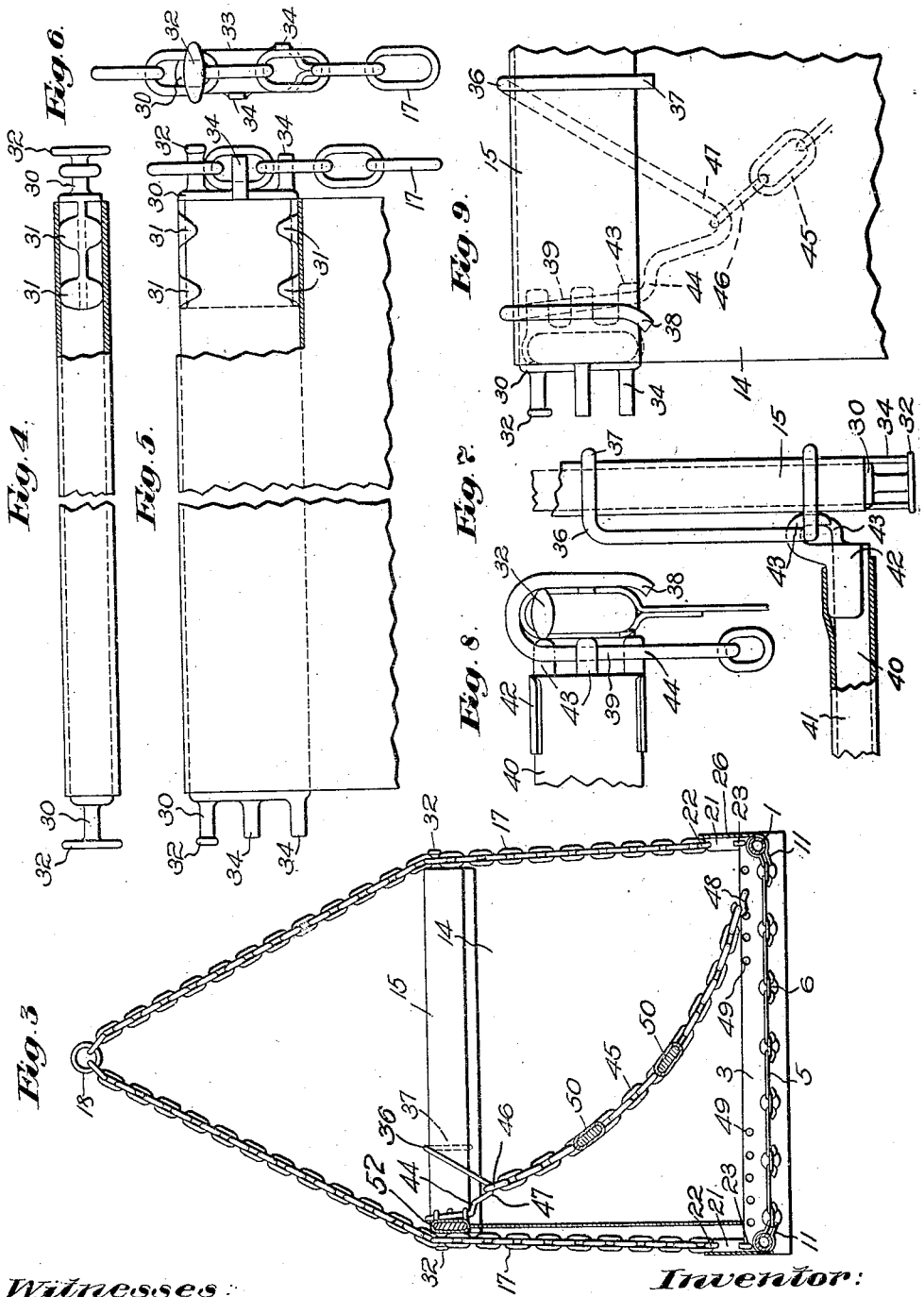

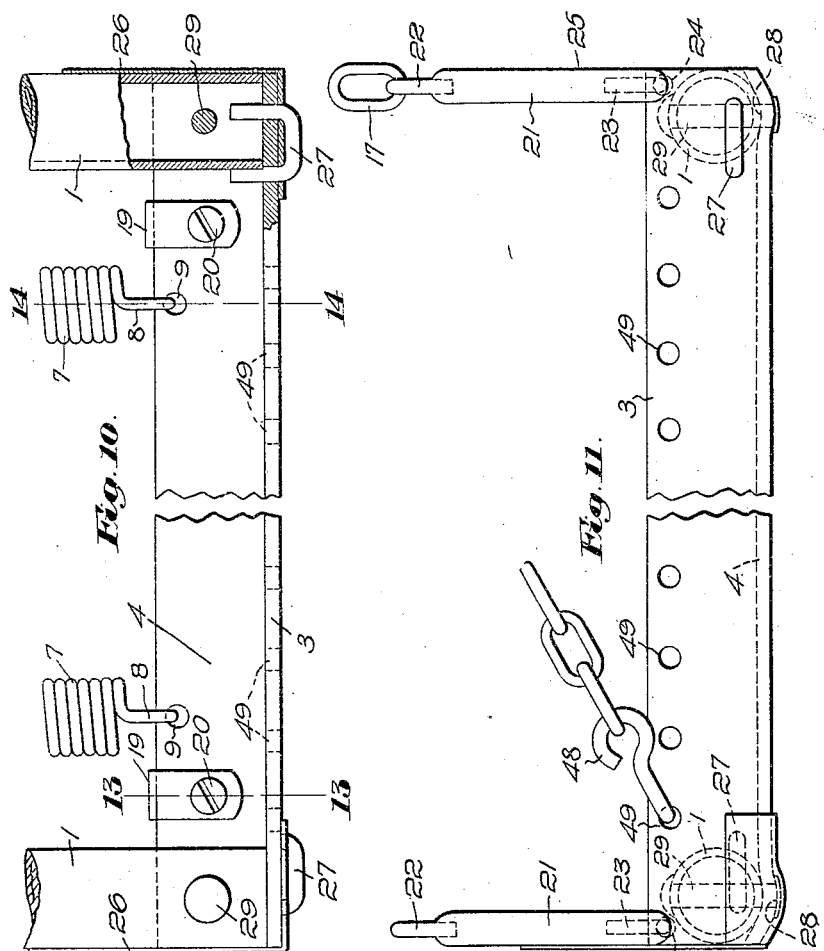

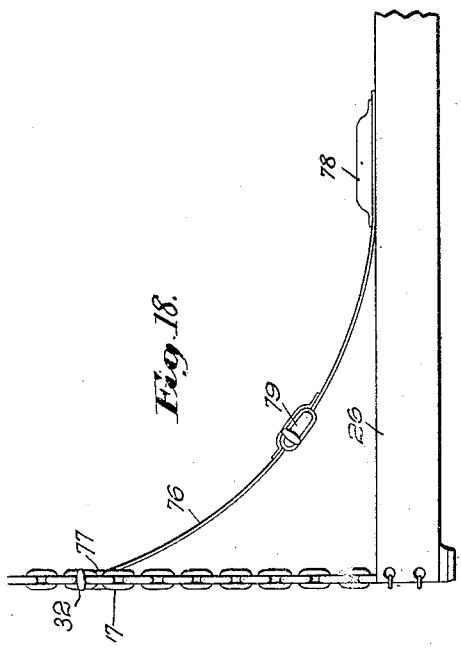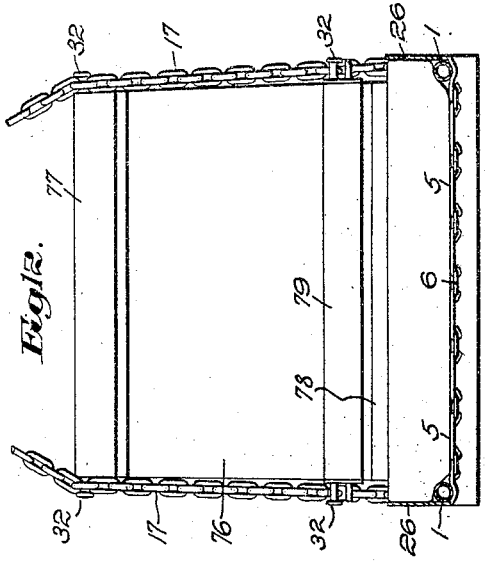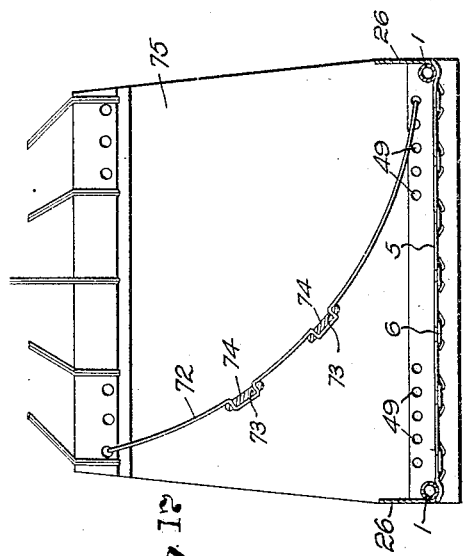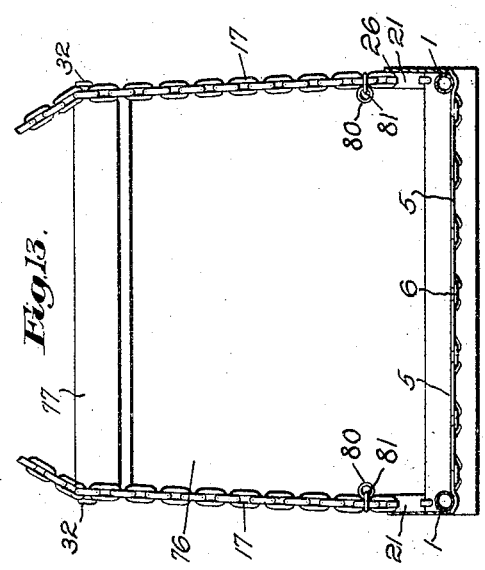

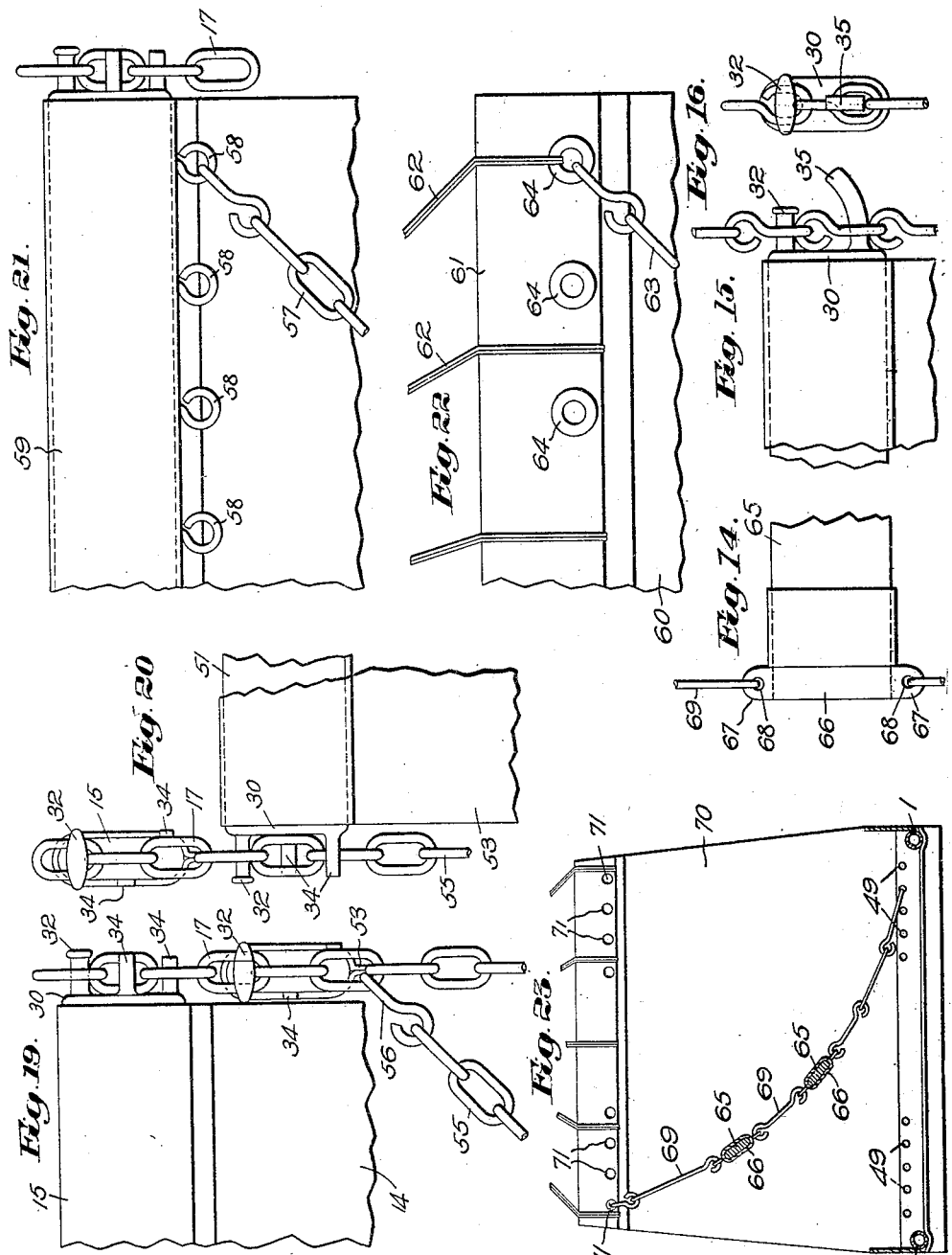

ISAAC E. PALMER, OF MIDDLETOWN, CONNECTICUT, ASSIGNOR TO THE I. E. PALMER CO., OF MIDDLETOWN, CONNECTICUT, A CORPORATION OF CONNECTICUT.

COUCH-HAMMOCK AND BACK-REST AND WIND-SHIELD THEREFOR.

1,053,860.  Specification of Letters Patent.  Patented Feb. 18, 1913.

Application filed September 23, 1912. Serial No. 721,765.

*To all whom it may concern:*

Be it known that I, ISAAC E. PALMER, a citizen of the United States, and a resident of Middletown, in the county of Middlesex and State of Connecticut, have invented an Improvement in Couch-Hammocks and Back-Rests and Wind-Shields Therefor, of which the following description, in connection with the accompanying drawings, is a specification, like characters on the drawings representing like parts.

This invention relates to couch hammocks, the object thereof being to improve certain parts thereof and more particularly the frame and the back rest or wind shield attachments thereof.

In order that my invention may be clearly understood, I have disclosed certain embodiments thereof in the accompanying drawings, wherein—

Figure 1 is a view mainly in plan of a couch hammock embodying my invention; Fig. 2 is a vertical longitudinal sectional view thereof; Fig. 3 is a vertical, transverse section thereof taken upon the broken line 3—3 of Fig. 2; Fig. 4 is a plan view of the upper spreader of a suspension end showing the same in the pocket thereof, the latter being partially broken away; Fig. 5 is a side elevation of the construction shown in Fig. 4; Fig. 6 is an end elevation thereof; Fig. 7 is a plan view of a portion of one suspension end and the adjacent back rest or wind shield; Fig. 8 is an end elevation of the wind shield spreader shown in Fig. 7; Fig. 9 is a detail in side elevation of the construction shown in Fig. 7 looking toward the left in said figure; Fig. 10 is a plan view, partially in section, of one end of the couch hammock frame; Fig. 11 is an end elevation thereof; Fig 12 is an end elevation of the construction shown in Fig. 15 looking toward the left in said figure. Fig. 13 is a view similar to Fig. 12 of still another form of the invention. Fig. 14 is a detail of one end of a bar or spreader shown in Fig. 23. Fig. 15 is a detail in side elevation showing a modified form of spreader. Fig. 16 is an end elevation thereof. Fig. 17 is a view similar to Fig. 19 of still another form of the invention, and Fig. 18 is a side elevation of one end of a couch hammock showing a convertible end and back rest constituting one form of the invention. Fig. 19 is a detail in side elevation representing one manner of supporting a back rest and wind shield; Fig. 20 is an end elevation of the construction shown in Fig. 19; Fig. 21 is a view similar to Fig. 19, but representing a different manner of supporting the back rest; Fig. 22 is a view similar to Fig. 19 of still another form of the invention; Fig. 23 is a view similar to Fig. 19 of still another form of the invention.

In the disclosed embodiments of my invention I have represented a metallic frame, but desire it to be understood that as regards other features of the invention, as, for example, the back rest or wind shield, said frame may be of non-metallic or partially non-metallic construction. In its preferred embodiment, however, I provide a frame having angled end members and tubular side members rigidly connected thereto, a suitable seating being connected to the side and end members of the frame. Suitable suspension means are provided for the frame. In the preferred embodiment, these suspension means are preferably strands connected to the corners of the frame, as, for example, chains, as herein shown. If preferred, however, I may employ other suitable suspension means, as, for example, sheet like suspension ends attached to the frame or continued from end to end as in the Gloucester type of couch hammock. In certain cases, I may employ both the suspension strands and the sheet like suspension ends. If the sheet-like suspension ends are employed, they constitute combined sheet-like ends and back rests, being attachable at their upper ends to the suspension strands and being of sufficient length, so that they may be utilized as back rests positionable at an incline beneath the back of the user. The back rest or wind shield is provided with end strands, to which one or more spreaders may be directly and detachably connected, said end strands being connected in suitable manner at the ends of the hammock, as, for example, to the hammock suspension strands, if the latter be employed, or directly to the suspension ends of the hammock, if the latter be present.

Referring more particularly to the drawings, and first to Figs. 1 to 5 thereof, the frame of the hammock is preferably composed of metallic side members 1—1 and metallic end members 2—2, the former being represented as cylindrical or tubular and the latter as angular. The adjacent terminals of these members are connected together in a manner to be more fully hereinafter described. The frame is provided with any suitable seating, such, for example, as one formed of wire links or rope or cloth. I have herein represented a seating composed of wire links 5 arranged in rectangular form and connected to plates 6, but it is to be understood that any other suitable seating may be employed. The seating is herein shown as connected to the end members 2 of the frame by coil springs 7, the ends 8 whereof take into perforations 9 in the inwardly extending web 4 of the end members of the frame.

The hammock may be provided with any suitable body. In Figs. 1, 2 and 3, I have represented the hammock as provided with sheet-like preferably cloth ends 14 having at their upper ends pockets 15 in which are mounted suitable spreaders 16. If desired, the said ends 14 may constitute the true suspension ends and may be provided at their upper ends with cords arranged at suitable intervals along the spreader and serving to support the hammock. Preferably, however, I provide suspension strands, here shown as chains 17. When using chains, I preferably employ four, one extending upwardly from each corner of the hammock frame, and at the upper ends thereof may provide suitable rings 18, by which the hammock may be suspended. Instead of providing suspension chains, I may provide other suitable suspension strands, such as cords or the like.

Heretofore, as disclosed in my Patent No. 944,814, I have provided corner brackets rigidly attached to the frame which afford back pieces or supports against which the upstanding fabric sides of the hammock body may be drawn tight. In this manner, I secure well defined and preferably rectangular corners at the meeting ends of the side and end members of the frame. This member is, however, extended substantially above the frame, and although very effective for its purpose may become damaged in packing or transportation. To avoid this objection, I provide elongated metallic links 21 shown most clearly in Fig. 11. Each link 21 is provided at its upper end with a hooked end 22 to engage the lower link of the adjacent chain 17, and at its lower end is provided with a hook 23 taking into a suitable perforation 24 at a point preferably so close to the extreme end of the web 3 that when the hammock is suspended the outer edge 25 of the link 21 is in alinement or forms a continuation of the vertical end edge of the said web 3.

If desired, I may provide the hammock with upstanding cloth or other suitable sides 26, the ends of which meet the vertical edges of the ends 14, to which they may be connected by cords passing through gromets or in any other suitable manner. These upstanding sides 26 may be connected to the frame in any suitable manner, as, for example, by staples 27 permitting the ready removal of said upstanding sides from the frame. It will be evident that the ends 14 and upstanding sides 26 may be tightly secured together and that the links 21 will provide rectangular corners at the meeting edges thereof. The said links 21, when the hammock is not suspended, assume a horizontal position, the eyes 23 turning in the holes 24 for this purpose. In such position of the parts, the said links 21 do not project substantially above the upper edge of the frame.

I have previously stated that the side members of the frame are composed of cylindrical and preferably tubular metallic members 1. In order to secure the side and end members of the frame rigidly together and to accomplish this result inexpensively and yet satisfactorily, I provide the end and yet satisfactorily, I provide the end members of the frame with some suitable formation extending out of the plane of the upper surface of the flange or web 4 thereof. Preferably I so bend the terminal portions of the webs 4 as to form slight recesses 28 into which the cylindrical side members 1 are seated. By providing a suitable recess or other supporting formation, I am enabled to secure the side and end members rigidly together by means of a single bolt 29 or the like at each corner of the frame. Each bolt passes through the meeting ends of the members 1 and 2 of the frame. While I prefer to provide recesses 28 to receive the ends of the side members 1 of the frame, I may provide projections integral with the said end members and extending upwardly from their upper faces against which the said side members take and are held by the bolts 29.

In the event that I employ suspension chains 17 or the like and in the event that I employ sheet-like ends 14, the spreaders 16 of the latter are not provided with suspension cords, but said spreaders are provided with end formations taking into or suitably received by the links of the said chain 17. One form of such construction is best illustrated in Figs. 4, 5 and 6, wherein the spreader 16 is represented as having secured to its end a metallic bracket 30 preferably received in the slitted end of the spreader and provided with integral boss portions 31 taking tightly against the outer surface of the spreader, as illustrated. From the bracket and preferably from the extreme end thereof, as illustrated, extends a suitable formation adapted to be interconnected with the adjacent chain. I have secured the best result by providing a hook, here shown as a T head 32 which can easily be inserted into any desired link 33 of the adjacent chain and be securely held therein and readily detached by turning the spreader or the chain with respect to each other. Within the scope of my invention, I provide a spreader having terminal holding hook-like members adapted to be inserted in and supported by the suspension means, said hook-like members having cross heads adapted to be turned across the receiving portion of the suspension means when engaged therewith, thereby preventing disengagement of the spreader from the suspension means without turning of said cross heads and suspension means. In order to hold the spreader in position with respect to the chain, I may in addition to the hook 32 provide one or more positioning members, as, for example, the projections 34—34 extending from the head end of the bracket and between which the chain lies, as indicated in Figs. 5, 6 and 20. Any other suitable construction or formation may, however, be provided. For example, in Figs. 15 and 16, I have represented the bracket 30 as having two hooks 32 and 35. The hook 32 is here represented as similar to the correspondingly numbered hook in Figs. 4, 5 and 6, and the hook 35 is preferably of the form shown and over which the next link of the chain 17 may take so as to hold the spreader in proper position with respect to the chain. In Figs. 15 and 16, I have shown a somewhat different form of chain from that illustrated in Fig. 3, and it is understood that in any event any suitable form of chain may be employed.

I provide the hammock with a suitable back rest or wind shield or both, and have herein shown several forms thereof. Preferably the back rest or wind shield is provided with end strands to which the rods or spreaders of the back rest or wind shield are preferably directly connected. In Figs. 3, 7, 8 and 9, I have represented one form of this part of my invention. Therein I have represented a wire bracket 36, the bent ends 37 and 38 whereof take over the spreader 16 and its pocket 15 as represented. This bracket 36 may be slid along the spreader 16, and fits the spreader tightly enough to be held by its own resiliency in any position to which it is adjusted. Therefore, it provides means for supporting the wind shield or back rest, as the case may be, but preferably the back rest at any desired point transversely of the frame. With the upstanding portion 39 of the bracket 36, I may interconnect in any suitable manner a spreader, such as that represented at 40 in Figs. 7 and 8. This spreader may be a rod or spreader of either a back rest or wind shield or of a combined back rest and wind shield. In Fig. 7, however, I have represented the spreader 40 as positioned in a pocket of a suitable wind shield 41 depending therefrom and have at its ends provided said spreader with a bracket 42 having a series of hooks 43 (preferably three in number) which take about the part 39 of the bracket 36, but permitting the ready detachability of said parts. It will be noted that the bracket 36 is provided with a bend 44 which assists in holding spreader 40 in the proper vertical position by affording a support for the lowermost hook 43. It will be observed that by adjusting the brackets 36, the wind shield itself may be adjusted transversely of the hammock. As previously stated, the spreader 40 may be a spreader of the back rest.

I have previously referred to the end strands of the back rest. The end strands constitute rope or chain-like members. One arrangement thereof is represented in Fig. 3, wherein is shown a chain 45, the upper end of which is provided with a hook 46 taking into the bend portion 47 of the bracket 36. The chain 45 depends in a loose flexible manner substantially as indicated, and at its lower end is provided with a two-ended hook 48 or other suitable means taking into one of a series of holes 49 in the web 3 of the adjacent suspension end 2. I preferably provide a series of these holes 49 adjacent each end of each end member 2, so that the back rest may be supported at either side of the hammock,—that is, either side of the hammock may be in the front.

The chains or other suitable strands 45 are adapted to receive one or more spreaders, rods or bars 50, as represented in Fig. 3. These spreaders, rods or bars are positioned at a suitable distance apart and at any vertical height desired, so as comfortably to support the back, as, for example, the upper and lower portions thereof. These spreaders may be suitably upholstered if desired. Preferably each spreader 50 is provided with end brackets 30, such as indicated in Figs. 4, 5 and 6, so that the T heads or any suitable hooks or supporting means thereof may detachably take into the links of the chains 45. It will be obvious that the back rest thus provided may be adjusted transversely of the hammock both at its upper and at its lower ends, and that the longitudinally extending members may be vertically adjusted. Moreover the flexible nature of the end strands 45 permits the spreaders to conform in position to the back of the hammock occupant. In the event that I employ chains for the back rest, the links thereof may be of any suitable shape and length.

In Fig. 3, I have represented the use of both a back rest and a wind shield, it being noted that the spreader of the wind shield 52 is supported by the wire brackets 36. It will, however, be understood that the spreader of the wind shield may be provided with end T heads or other suitable formations by which it is directly connected to the chains 45, the latter, as shown in Fig. 3, being directly connected to the brackets 36. It is to be understood that the rod or spreader of the wind shield may be supported by the end suspension means (which may be ropes or chains or other suitable devices) either indirectly as shown, or in any other suitable manner, and that the rope or chain-like members of the back rest may be supported at their upper portions or ends by the supporting means for said wind shield spreader, as shown in Fig. 3, or in any other suitable manner. The rope or chain-like members of the back rest may be supported at their upper ends, within the scope of my invention, in any suitable manner and to any suitable part of the hammock, their direct support or their ultimate support, as the case may be, being the hammock suspension means.

Instead of connecting the strands or chains of the back rest to brackets 36, I may support them in any other suitable manner. For example, in Fig. 19, I have represented suspension chains 17 whereon is supported a wind shield 53 having the spreader 51 thereof detachably connected to said chains 17 by end hooks or T heads 32 or other suitable formation, as previously described. The end chains or strands 55 for the back rest are provided with hooks 56 taking directly into links of the suspension chains 17 at any suitable elevation. Thus, in this form of the invention, the end strands or chains of the back rest are directly connected at their upper ends to the suspension chains 17. It is not necessary, however, that the end strands or chains of the back rest be directly connected at their upper ends to the suspension chains or other suspension means, as they may be directly supported at their upper ends or portions to any desired part and in any desired manner.

In that form of the invention shown in Fig. 21, I have provided suspension chains 17, but instead of connecting the end strands or chains 57 of the back rest thereto, I have provided a series of screw eyes 58 taking into the transversely extending or end spreader 59. This permits the transverse adjustment of the chains 57. Instead of providing screw eyes 58, I may provide eyes or sockets in the spreaders 59, into which the chains 57 take in a preferably detachable and adjustable manner. I may, if desired, do away with suspension chains 17 and provide fabric or other sheet-like suspension ends 60, shown in Fig. 22. Each suspension end 60 is provided with a spreader 61 and stringing cords 62. The end strands or chains 63 of the back rest may be connected in any suitable manner to the end 60, as by means of hooks engaging holes 64 in the spreaders 61. By providing a series of holes 64, I may provide for the transverse adjustment of the upper end of the chains 63.

It will be understood that in each of the forms shown, the lower ends of the chains are adapted to be connected to the frame or some suitable portion of the hammock, so as to permit transverse adjustment of the lower end thereof and that the spreader or spreaders or other suitably longitudinally extending means may be detachably connected to the links at any suitable elevation, as previously described. The same is true of all forms of back rest disclosed in this application. My invention is not however limited to these features or connections.

In Figs. 23 and 14, I have shown still another form of back rest. Therein, I have provided one or more spreaders 65, and at each end of said spreader or spreaders I have provided suitable formations for connecting the links or chain thereto. Preferably I provide a bracket 66 having ears 67, into holes 68 of which the hooked ends of wire links 69 may take. In this manner, a comparatively few number of links may be employed at each end of the back rest, and the vertical height of the spreader 65 may be varied by changing the positions of the links and spreaders. In this form of the invention, I have represented the hammock as provided with a suspension end 70, and the spreader thereof is provided with a suitable number of holes 71, into the desired one of which the upper link or hook of each chain may take. In this form of the invention, as in each of the forms herein represented, the back rest may be supported at either side of the hammock. In other words, I provide means for attaching the upper end of the chain at either side of the hammock and the lower end of the chain at either side of the hammock.

In Fig. 17, I have shown still another and a very simple form of the invention. Therein, I have represented cords or ropes 72, the upper and lower ends of which may be detachably and adjustably connected in any of the ways herein disclosed, as, for example, by hooks engaging with perforations, screw eyes or adjustable brackets. Each cord 72 is reeved through two holes 73 in the spreader or spreaders 74, as clearly illustrated, the cords 72 and spreaders 74 binding together, so that the spreader or spreaders are securely held in any desired position. Nevertheless the said spreader or spreaders may be readily adjusted vertically by sliding them along the cords 72. The said cords 72 may be attached to suspension ends 75, or if desired they may be directly connected to suspension chains 17 in any of the ways previously set forth in connection with other forms of the back rest.

In Figs. 18, 12 and 13, I have represented a convertible end and back rest. When using this convertible end and back rest, I employ suspension strands, as, for example, the chains 17 previously described as connected to the corners of the frame in any suitable manner, as, for example, in the way already described. The convertible end and back rest is represented at 76 as a sheet-like strip preferably of textile material having at its upper end a spreader 77 in a suitable pocket. This spreader is preferably provided at its ends with brackets, such as represented in Figs. 4, 5 and 6, so that the spreader may be detachably and adjustably connected to the suspension chains 17. The strip 76 is of sufficient length, so that it may extend at a downward inclination beneath the body of the user, as, for example, beneath the hips of the user, and may there be provided with a pillow 78. In this manner, the user holds the back rest at any desired inclination, as more fully set forth in my Patents No. 972,712 and No. 972,713. The said strip 76 is provided at a suitable point with means whereby it may be detachably connected to the strands or chains 17 near the corners of the frame, and when in this position the remaining portion of the strip is rolled or folded up at the head end of the hammock. Any suitable means may be provided to connect this strip 76 to the lower parts of the chains 17. For example, I may provide a spreader 79 in a suitable pocket of the strip 76, and it may be similar in construction to the spreader shown in Figs. 4, 5 and 6, so that it may be detachably engaged with suitable links of the chain 17. When the spreader 79 is thus engaged with the chains 17, then the strip 76 constitutes an end of the hammock and the remaining portion is rolled up close thereto. Instead of employing a spreader 79, I may provide the strip 76 with gromet eyes 80 at suitable points, whereby the said strip may be secured by lacing 81 to the chains 17.

It will be understood that the form of spreader shown in Figs. 4, 5 and 6 and the form of spreaders shown in Figs. 15 and 16 may be employed in each and every position where a spreader is interconnected or attached to a chain. In other words, these forms of spreaders may be used as transversely extending or end spreaders or as side spreaders for back rests or wind shields.

In the claims I employ the term "back rest" in a somewhat generic sense, as the back rest proper may partake also in part at least of the functions and nature of a wind shield. The term "wind shield" is employed in a more specific sense.

The spreader of the back rest or wind shield is provided as herein represented with projections, one form of which is the T-head hook 32. This head is adapted to engage either with the links of the chains or with openings in the flexible or cloth suspension ends. In either case, the said projections constitute self-locking, rigid projections adapted to enter openings in the suspension chains or suspension means and constituting quick adjusting means for flexibly or loosely connecting the spreader and the suspension means. Preferably this is accomplished either by holding the spreader rigid and by turning the chain until the hook 32 can enter the same, whereupon the chain is dropped into normal position and the second projection 35 (see Fig. 25), if employed, may engage another link of the chain; or the chain may be held rigid and the spreader turned until a similar interlocking engagement of the spreader and chain can be effected. In other words, the chain and the hook like projection of the spreader are turned relative to each other, so as to secure the interengagement and locking of the spreader and suspension means.

It will be observed that in all the forms of back rest, the flexible end strands are connected at their upper and lower ends with capacity for transverse adjustment, the spreader or spreaders or other suitable longitudinally extending means being vertically adjustable.

It is, of course, to be understood that the back rest and wind shield may be used with other forms of couch hammocks and other forms of couch hammock frames, and that the hammock frame herein disclosed may be used with other types of couch hammocks. If upstanding suspension sides be employed, they may be detachably connected intermediate their ends to the longitudinal members of the frame in any suitable manner, as by means of gromet eyes and lacing. It will moreover be understood that in their various forms, the back rests and wind shields may be used together if desired. They are, however, capable of separate use.

Having thus described one illustrative use of my invention, I desire it to be understood that although specific terms are employed, they are used in a generic and descriptive sense and not for purposes of limitation, the scope of the invention being set forth in the following claims.

Claims.

1. A couch hammock comprising a frame having suspension means apertured at intervals, and a back rest therefor consisting of rope or chain-like members supported at their upper ends by said frame suspension means, and connected at their lower ends to the hammock in advance of the points of support of the said upper ends, said back rest having a spreader connected at its ends to said rope or chain-like members.

2. A couch hammock comprising a frame having suspension means and a back rest therefor consisting of rope or chain-like members having the upper ends thereof connected to and adjustable along the suspension means at substantially the back side of the hammock and having their lower ends connected to and adjustable along the hammock adjacent the front side thereof, said back rest having a spreader directly connected at its ends to said members.

3. A couch hammock comprising a frame having suspension rope or chain-like members and a back rest therefor having similar members directly received and supported by said suspension members, said back rest members supporting a rod or spreader, and means for transversely varying the position of said back rest.

4. A couch hammock comprising a frame having rope or chain-like suspension members and a back-rest therefor consisting of similar members connected at their upper ends to said suspension members and at their lower ends to the hammock frame, said back-rest having a spreader the ends whereof are connected thereto.

5. As an article of manufacture, a back rest for a couch hammock consisting of end chains having hooks at their upper and lower ends, and a rod or spreader having end formations directly received in links of said end chains.

6. A couch hammock comprising a frame having end suspension means, and a back rest therefor consisting of a pair of rope or chain-like members adapted to be supported at their upper ends by the hammock suspension means and adapted for connection to the hammock at their lower ends, said back rest having a spreader connected at its ends to said members.

7. In combination, a couch hammock comprising a frame, end suspension means therefor, and a back rest for said hammock consisting of end rope or chain-like members supported at their upper ends by the said end suspension means and extending downwardly from said points of support, and a back rest member proper extending between and supported by said rope or chain-like members.

8. In combination, a couch hammock comprising a frame, flexible end suspension means therefor having openings, and a spreader for a back rest or wind shield for said hammock, said spreader having each of its ends provided with a locking, rigid projection adapted to enter one of said openings and constituting means for flexibly locking said spreader and the said flexible end suspension means.

9. In combination, a couch hammock comprising a frame, flexible end suspension means therefor having openings, and a spreader for a back rest or wind shield having each of its ends provided with two projections constituting means for loosely connecting said spreader and said end suspension means, at least one of said projections at each end of the spreader having a locking formation adapted to enter one of said openings, and the other projection at each spreader end engaging the suspension means and coöperating with the adjacent entering projection to prevent twisting of the spreader.

10. In combination, a couch hammock comprising a frame, suspension chains at the corners thereof, and a spreader for a back rest or wind shield for said hammock, said spreader having each of its ends provided with two projections adapted to enter links of a suspension chain, and constituting means for loosely connecting the spreader and the suspension chains and also for preventing twisting of said spreader relative to said chains.

11. In combination, a couch hammock comprising a frame, flexible end suspension means therefor having openings and a spreader for a back rest or wind shield for said hammock, said spreader having terminal, holding, hook-like members adapted to be inserted in said openings and to be thereby loosely supported by said suspension means, said hook-like members having cross heads adapted to be turned across the said openings when engaged therewith and constituting means for loosely locking said spreader and said flexible end suspension means together.

In testimony whereof, I have signed my name to this specification, in the presence of two subscribing witnesses.

ISAAC E. PALMER.

Witnesses:
  IRVING U. TOWNSEND,
  ROBERT H. KAMMLER.